US010837857B2

(12) United States Patent
Bruhns et al.

(10) Patent No.: US 10,837,857 B2
(45) Date of Patent: Nov. 17, 2020

(54) GAS LEAK SEARCH USING A TEST GAS SPRAY DEVICE

(71) Applicant: INFICON GmbH, Cologne (DE)

(72) Inventors: Hjalmar Bruhns, Syracuse, NY (US); Ernst Franke, Cologne (DE); Ralf Kilian, Cologne (DE); Jörn Liebich, Cologne (DE); Norbert Moser, Cologne (DE); Jochen Puchalla-König, Cologne (DE); Norbert Rolff, Cologne (DE); Randolf Rolff, Cologne (DE); Daniel Wetzig, Cologne (DE)

(73) Assignee: INFICON GmbH, Cologne (DE)

( * ) Notice: Subject to any disclaimer, the term of this patent is extended or adjusted under 35 U.S.C. 154(b) by 47 days.

(21) Appl. No.: 16/089,665

(22) PCT Filed: Mar. 28, 2017

(86) PCT No.: PCT/EP2017/057294
§ 371 (c)(1),
(2) Date: Sep. 28, 2018

(87) PCT Pub. No.: WO2017/167738
PCT Pub. Date: Oct. 5, 2017

(65) Prior Publication Data
US 2019/0120715 A1 Apr. 25, 2019

(30) Foreign Application Priority Data
Mar. 31, 2016 (DE) .......................... 10 2016 205 381

(51) Int. Cl.
*G01M 3/20* (2006.01)
*G01M 3/22* (2006.01)

(52) U.S. Cl.
CPC ............ *G01M 3/205* (2013.01); *G01M 3/226* (2013.01)

(58) Field of Classification Search
CPC .............................. G01M 3/205; G01M 3/226
(Continued)

(56) References Cited

U.S. PATENT DOCUMENTS 4,898,021 A 2/1990 Weaver et al.
5,821,404 A 10/1998 Bohm et al.
(Continued)

FOREIGN PATENT DOCUMENTS

CN  1043200 A  6/1990
CN  101040179 A  9/2007
(Continued)

*Primary Examiner* — Nathaniel T Woodward
(74) *Attorney, Agent, or Firm* — The Webb Law Firm

(57) ABSTRACT

The invention relates to a gas leakage search device including a test gas spray device for spraying a test object with a test gas, a vacuum assembly for evacuating the test object, wherein the vacuum assembly has a vacuum pump and a gas detector downstream of the test object for measuring the test gas proportion, and an analysis unit which evaluates the measurement signal of the gas detector. The invention is characterized in that a data communication connection is established between the spray device and the analysis unit; the spray device is designed to detect at least one point in time of the spraying process and to transmit same to the analysis unit, and the analysis unit is designed to output the corresponding measured test gas proportion at the transmitted point in time of the spraying process.

8 Claims, 1 Drawing Sheet

(58) Field of Classification Search
USPC .............................................................. 73/40
See application file for complete search history.

(56) References Cited

U.S. PATENT DOCUMENTS

| | | |
|---|---|---|
| 5,907,092 A | 5/1999 | Bohm |
| 8,297,109 B2 | 10/2012 | Schwartz et al. |
| 2009/0013766 A1* | 1/2009 | Liebich ................ G01M 3/202 |
| | | 73/40.7 |
| 2020/0009591 A1 | 1/2020 | Chapron et al. |

FOREIGN PATENT DOCUMENTS

| | | |
|---|---|---|
| DE | 4228148 A1 | 3/1994 |
| DE | 102004050762 A1 | 4/2006 |
| JP | 6217627 A | 1/1987 |
| JP | 2-120635 A | 5/1990 |
| JP | 2120635 A | 5/1990 |
| WO | 2017125327 A1 | 7/2017 |

\* cited by examiner

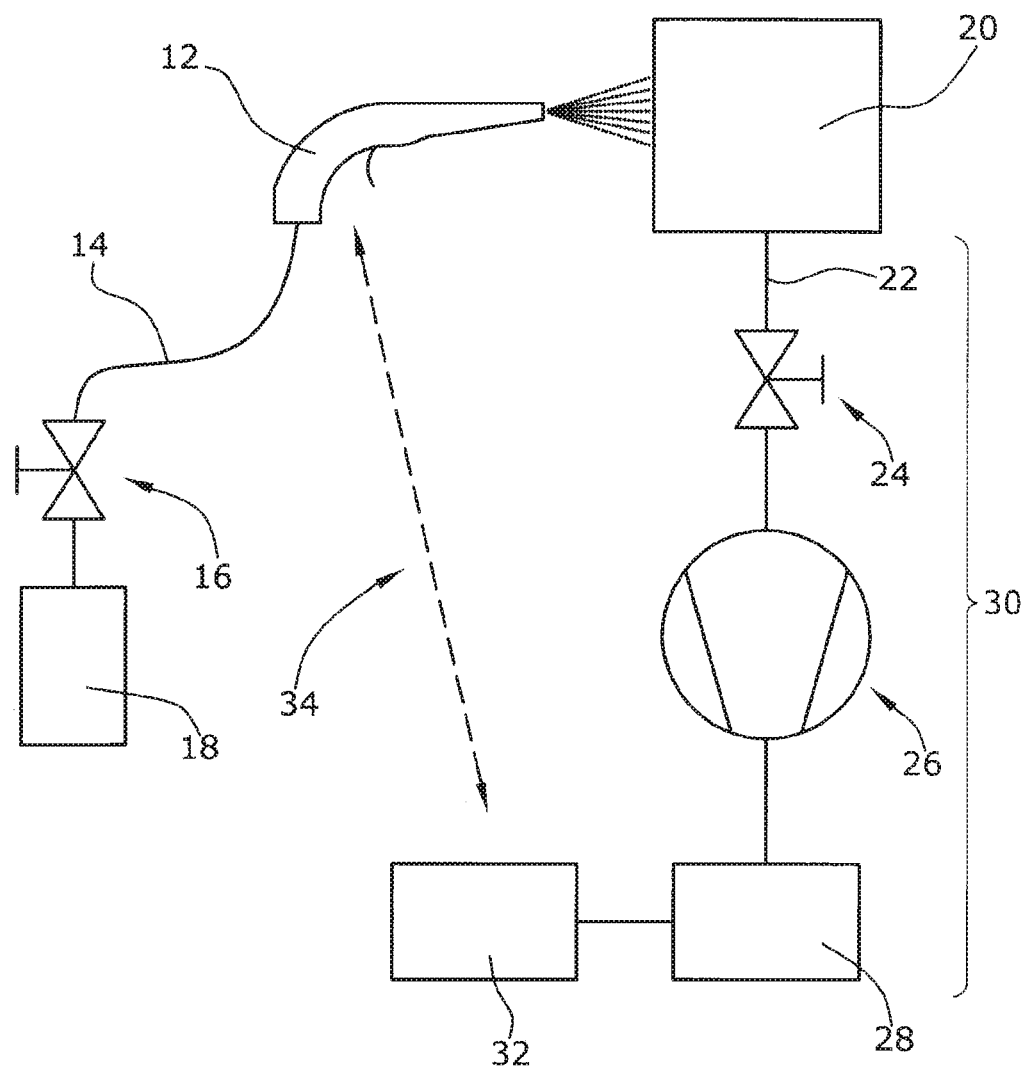

GAS LEAK SEARCH USING A TEST GAS SPRAY DEVICE

CROSS-REFERENCE TO RELATED APPLICATIONS

This application is the United States national phase of International Application No. PCT/EP2017/057294 filed Mar. 28, 2017, and claims priority to German Patent Application No. 10 2016 205 381.7 filed Mar. 31, 2016, the disclosures of which are hereby incorporated in their entirety by reference.

BACKGROUND OF THE INVENTION

Field of the Invention

The present invention relates to a device and a method for gas leak detection by use of a test gas spraying device.

Description of Related Art

It is known that, with the aid of a spray gun, test gas such as, e.g., helium can be sprayed onto test object which is evacuated by a vacuum system. The vacuum system comprises a vacuum pump for evacuating the test object and a gas detector for detecting the test gas content in the evacuated gas flow. If the test object comprises a leak and the test gas flow discharged from the spray gun approaches the leak, the test gas content in the evacuated gas flow will increase. In the process, the increase of the test gas content in the evacuated gas flow will be understood as an indicator that the spray gun is approaching a leak in the test object. Thus, by monitoring the test gas content in the sucked gas flow while the spray gun is being moved across the test object, the position of a leak can be identified. The spray gun can be e.g., a compressed-air gun which, via a hose, is connected to a test gas pressure bottle or to a rubber bladder. In case of a gas bottle, the pressure at the compressed-air gun and thus the throughflow will be adjusted by a pressure reducer in the gas bottle.

Generally, in this kind of localizing test for ensuring vacuum tightness, a problem resides in that true leakage signals cannot always be reliably distinguished from interfering signals. Interfering signals may be caused by noise of the background signal, drift of the background signal, large-sized test objects with several leakage sites which undesirably happen to be reached by test gas, or by long delay times due to the run-time and the time constant in the vacuum system, so that the attributing of leakage signals is rendered difficult.

A further disadvantage is caused if the vacuum connection and the sites under examination are spatially far remote from each other. In such cases, a correct dosing of the sprayed test gas cloud will pose difficulties. Leak detection will often have to involve the participation of two persons. Heavy test gas bottles have to be transported; for instance, they may have to be carried across several floors of a building.

SUMMARY OF THE INVENTION

It is an object of the invention to provide an improved method and an improved device for localizing a gas leak on a test object by use of a test gas spraying device.

The device according to the invention is described in the non-limiting embodiments below. The method according to the invention is described in the non-limiting embodiments below.

The spraying device is adapted to capture at least one point in time of the spraying process, e.g., the start of the spraying. Between the spraying device and the evaluation unit for evaluating the measurement signal of the test gas detector, a data communication link is provided. Via the data communication connection, the times captured by the spraying device and said at least one point in time of the spraying process can be transmitted to the evaluation unit. The evaluation unit is adapted to bring the time points transmitted by the spraying device in correlation with the respective measurement signal. This makes it possible to realize whether the increase of the test gas partial pressure in the measurement signal is caused by the spraying with the aid of the test gas spray gun. Advantageously, also the point in time of the end of the test gas spraying will be transmitted by the spraying device to the evaluation unit and, in the evaluation unit, will be correlated with the measurement signal. The spraying device can be a spray gun which, via a hose, is connected to a pressurized gas source containing the test gas.

According to a preferred embodiment of the invention, the spraying device generates a series of a plurality of short test gas pulses, i.e., the test gas will be discharged by the spraying device in a pulsed manner. In the process, at least the point in time of the start of a pulse series will be transmitted to the evaluation unit, and preferably also the time point of the respective end of a test gas pulse series.

Particularly, also the duration of the test gas discharge can be electronically detected and be transmitted to the evaluation unit. Application of the test gas in a predetermined pulse sequence can allow for a differentiation from interfering test gas background concentrations because these are constant or at least are variable merely slowly, whereas a test gas from the spraying device that is penetrating into the test object via a leak can do so only during the spraying.

Advantageously, also the measurement signal or the temporal development of the measurement signal can be communicated by the evaluation unit to the spraying device and respectively to an output device arranged near the spraying device, such as e.g. a monitor.

Generally, the invention is thus based on the idea to capture time points of the spraying process performed by use of the spraying device and to transmit them to the evaluation unit and, in the evaluation unit, to correlate the measurement signal with the time points of spraying.

BRIEF DESCRIPTION OF THE DRAWING

An exemplary embodiment of the invention will be explained in greater detail hereunder with reference to the drawing:

FIG. 1 is a schematic diagram of a device and method according to non-limiting embodiments or aspects of the present invention.

DESCRIPTION OF THE INVENTION

With specific reference to FIG. 1, a spray gun 12 is connected, via a pressurized air hose 14 and a shut-off valve 16, to a pressurized helium source 18. Alternatively, the shut-off valve 16 can be arranged in the spray gun 12. The helium is the test gas to be sprayed onto the test object 20 for detecting and localizing a leak on the test object.

The test object 20 is connected, via a gas-conducting connection 22 and a shut-off valve 24, to a vacuum pump 26 for evacuating the test object 20. Downstream of vacuum pump 26, a gas detector in the form of a mass spectrometer 28 is arranged. Mass spectrometer 28 is operative to determine the helium partial pressure in the gas flow sucked from the test object 20. The above elements 22, 24, 26, 28 form a vacuum system 30. Mass spectrometer 28 is connected to an evaluation unit 32 operative to continuously evaluate and display the measurement signal.

With further reference to FIG. 1, a data communication link 34 between spray gun 12 and evaluation unit 32 is schematically indicated by an interrupted line. This can be a wireless connection such as, e.g., a radio, WLAN, infrared, or Bluetooth connection, or a wired data connection.

According to the invention, at least time points are transmitted from the spray gun 12 to the evaluation unit 32, namely at least the time point of the start of spraying, and preferably also the duration of the spraying and the time point of the end of spraying. In a pulsed spraying process controllable via valve 16, the start of spraying, the duration and the end of each spraying pulse or of the spraying pulse series will be transmitted to evaluation unit 32.

In the reverse direction, the measurement signals will be transmitted from evaluation unit 32 to an output unit (not shown) connected to spray gun 12 or arranged near spray gun 12. Thereby, it is possible for the user to have convenient visual access to the measurement results and to modify the spraying action correspondingly. As soon as the user notes an increase of the helium concentration, he/she can guide the spray gun 12 in a well-aimed manner into the required direction in order to detect the spraying site of the generation of the maximum leakage signal. The measurement signal can be transmitted via said data communication connection 34, e.g., to a smartphone or a tablet PC.

The above vacuum system 30 can be a helium vacuum leak detector which is connected to test object 20. The connection site can be the pre-vacuum region of a multi-stage pump system on the test object. Alternatively, however, the connection can also lead directly to the vacuum chamber or to the exhaust duct of the pre-vacuum pump of the pump system.

The reaction time—the vacuum time constant—of the system will be detected. For this purpose, a spray-on pin leak has to be flanged into place on the vacuum chamber under testing. Said pin leak will be continuously spayed with helium; at the same time, the signal development will be detected by the leak detector. The spraying onto the pin leak will be continued until a stable signal is indicated on the leak detector. From the development of the increase of the signal, the vacuum time constant of the system can be determined. Alternatively, the time constant can be determined on the basis of the decay curve which is measured after termination of the helium spraying. Typical time constants of systems are in the range from 1 to 10 seconds and partly are still distinctly longer.

In leak tightness testing, a spraying process is composed of a plurality of successive spray pulses. With knowledge of the measured vacuum time constant of the system, the duration of the helium spray pulses and the temporal interval between the pulses can be set. The duration of the pulses and the temporal interval between the pulses should be about half of a vacuum time constant or less. In case of system time constants above 10 seconds, pulse durations of $1/10$ or less will be selected. The number of spraying pulses per spraying process should be about three to five. The duration between the individual pulses can be different. The more characteristic the pulse sequence is, the better the signal sequence can be recognized at the leak detector in case of a detected leakage.

With this determined sequence of helium pulses (e.g., by use of the method according to U.S. Pat. No. 8,297,109 B2), the vacuum chamber will be sprayed at the test sites so as to localize leakage sites.

During the spraying onto a leakage site, the pulse sequence set for the helium spraying will be transferred to the temporal development of the measured leak rate signal. Thereby, in signal evaluation, disturbances of the signal due to drift, noise or other causes that do not comprise this pulse sequence pattern or that occur to early or too late in relation to this pulse sequence pattern, can be distinguished from true leak rate signals.

For enhancing the pulse sequence, the helium can be actively blown away between the helium pulses, e.g. with the aid of a cyclically starting blower on the spray gun.

The invention makes it possible to clear the evaluation of the measurement signals from interfering influences. The result is made available to the user directly at the test site, and the user will not need to be in direct contact with the measurement device (vacuum leak detector). Via the data connection 34, recommendations for the spraying behavior can be transmitted to the spray gun for the user's attention. Leak detection can be performed by involvement of merely one person. No heavy helium bottles have to be carried by hand. The consumption of helium can be reduced. A compact design with improved accessibility is rendered possible. Faulty adjustments of the spray gun, such as, e.g., too much or too little helium, can be prevented. For optimizing the spraying process, a larger quantity of helium can be sprayed for localization and, then, a lesser quantity of helium can be sprayed for quantification.

The invention claimed is:

1. A device for gas leak detection, comprising a test gas spraying device including a housing for spraying test gas onto a test object, a vacuum system for evacuating the test object, wherein said vacuum system comprises a vacuum pump, and, downstream of the test object, a gas detector for measuring a test gas content, and an evaluation unit for evaluating a measurement signal of the gas detector,
   wherein a data communication connection is provided within the housing between the spraying device and the evaluation unit,
   wherein the spraying device is configured to capture at least one time point of a spraying process and to communicate said at least one time point via the data communication connection to the evaluation unit, and
   wherein the evaluation unit is configured to indicate the test gas content corresponding to said at least one time point.

2. The device according to claim 1, wherein the data communication connection is configured to transmit measurement values from the evaluation unit to the spraying device.

3. The device according to claim 2, wherein the spraying device is provided with an output device for outputting the measurement values.

4. The device according to claim 1, wherein the spraying device is configured for pulsed discharge of the test gas, and wherein time points of a start and end of a test gas pulse or of a series of successive test gas pulses are respectively transmitted to the evaluation unit.

5. A method for gas leak detection by use of a test gas spraying device and a vacuum system connectible to a test object, said vacuum system comprising a vacuum pump for evacuating the test object and a gas detector arranged downstream of the test object, the method comprising:

detecting a test gas content in a gas flow evacuated from the test object;

capturing, by electronics housed within the spraying device, at least one time point of a spraying process;

communicating the at least one time point to an evaluation unit evaluating a measurement signal of the gas detector; and correlating the at least one time point with the measurement signal for detecting at least the test gas content at a respective time point of the spraying process.

6. The method according to claim 5, wherein a time point of a start of the spraying process and/or a time point of an end of the spraying process is communicated from the spraying device to the evaluation unit and are correlated with the measurement signal of the gas detector.

7. The method according to claim 5, wherein, during measurement, the measurement signal is transmitted to the spraying device or to an output unit arranged near the spraying device.

8. The method according to claim 5, wherein the test gas is discharged from the spraying device in short pulses, and wherein time points of a start and end of a test gas pulse or of a series of successive test gas pulses are respectively communicated to the evaluation unit for correlation with the measurement signal.

* * * * *